Figure 3:
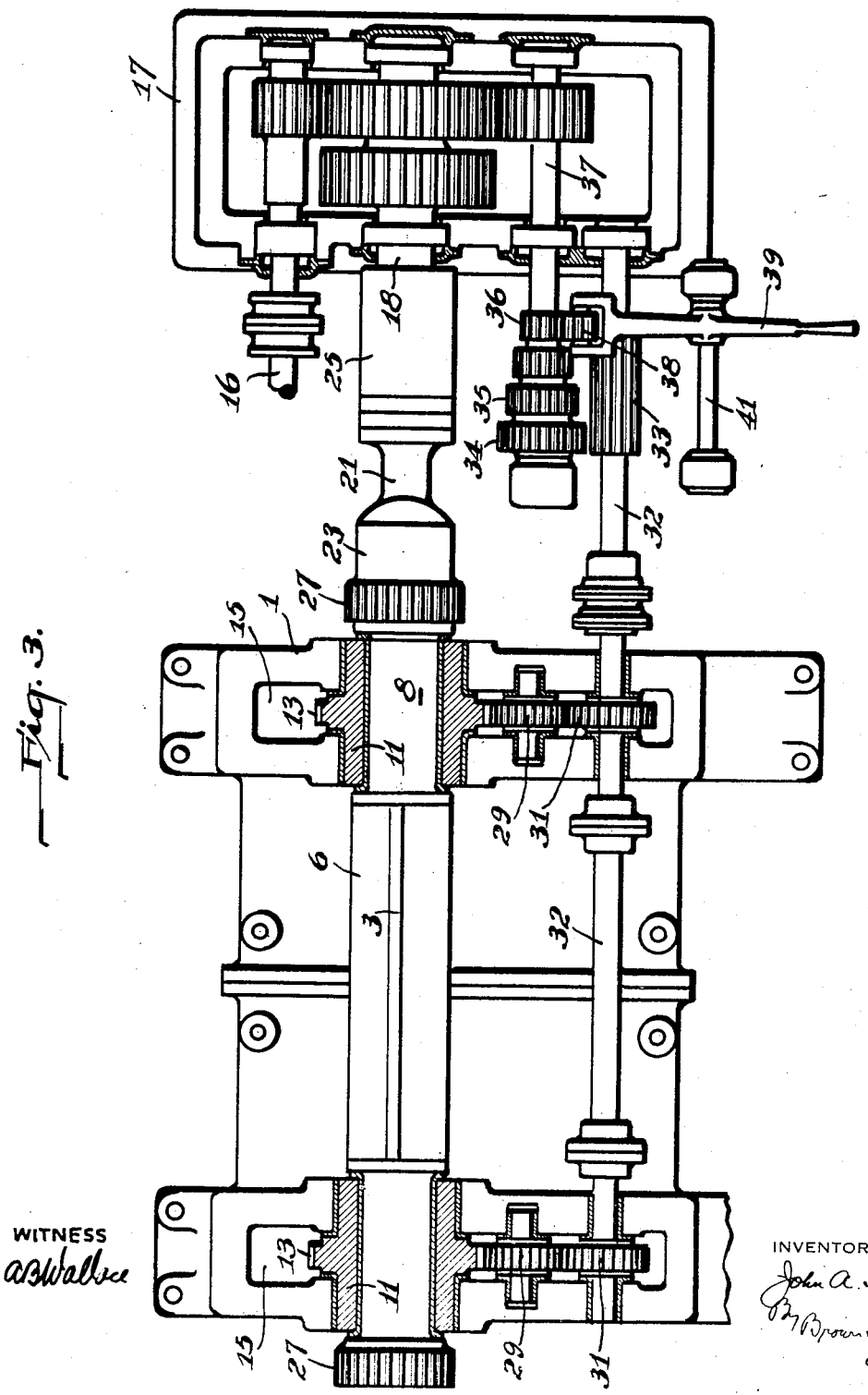

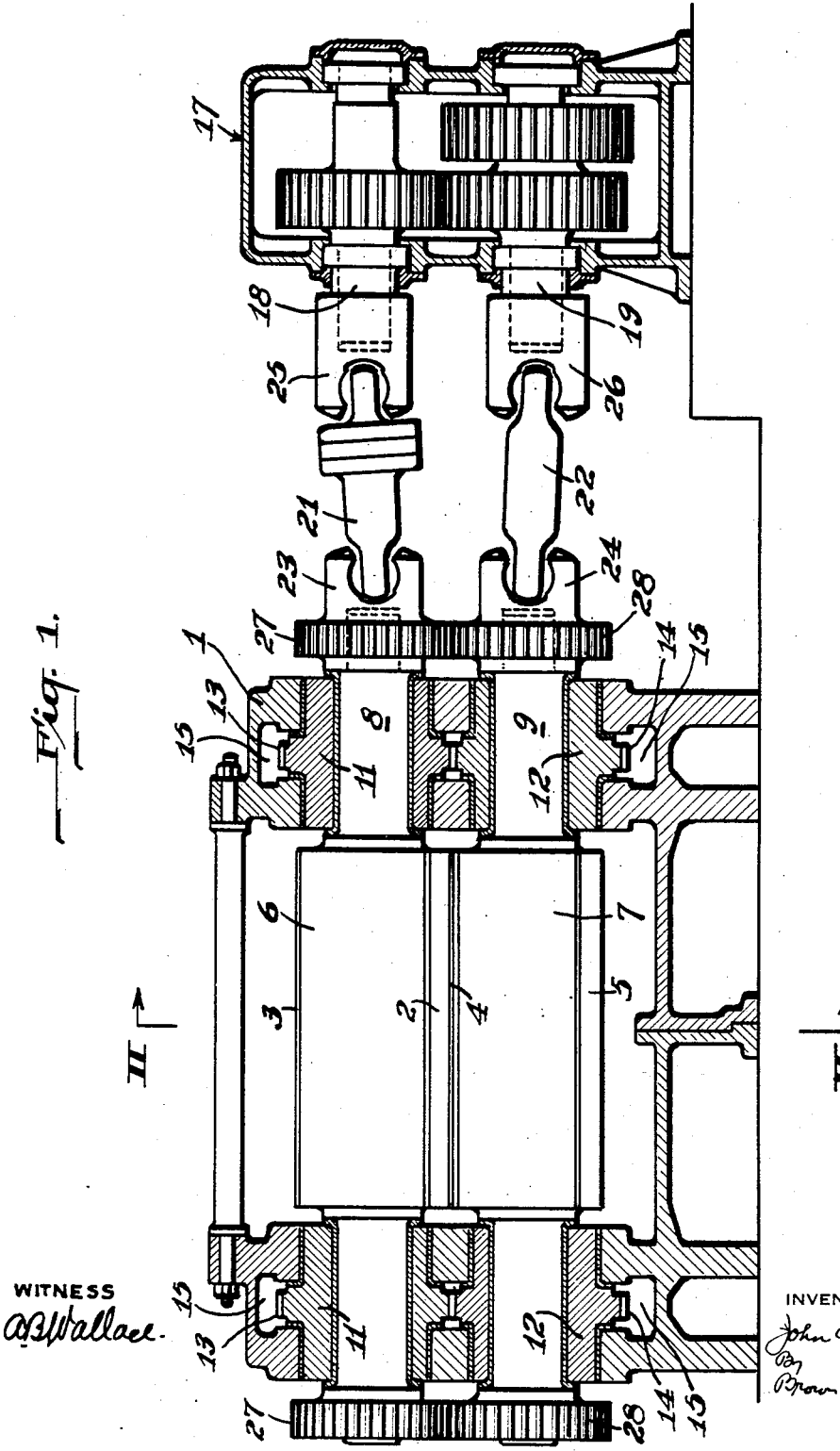

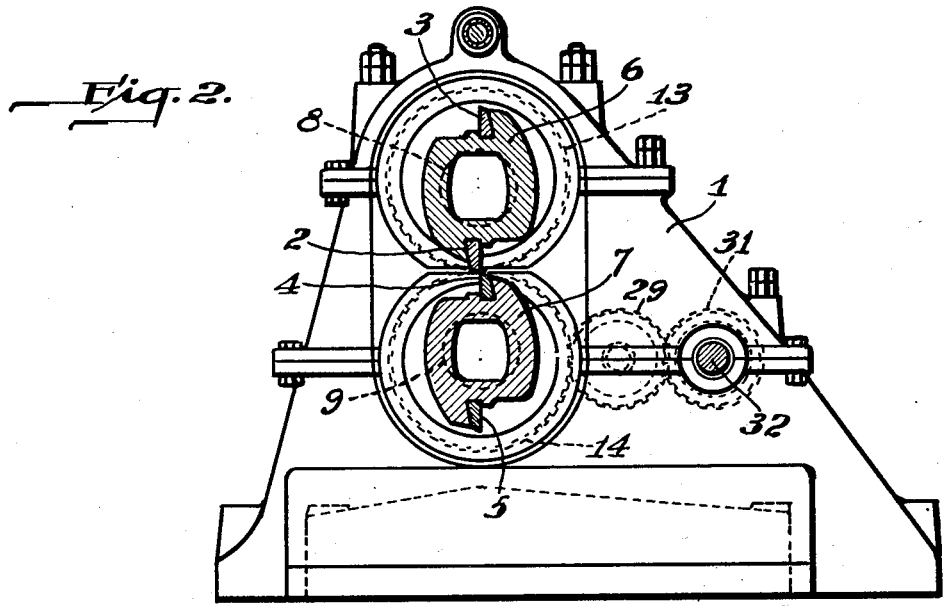
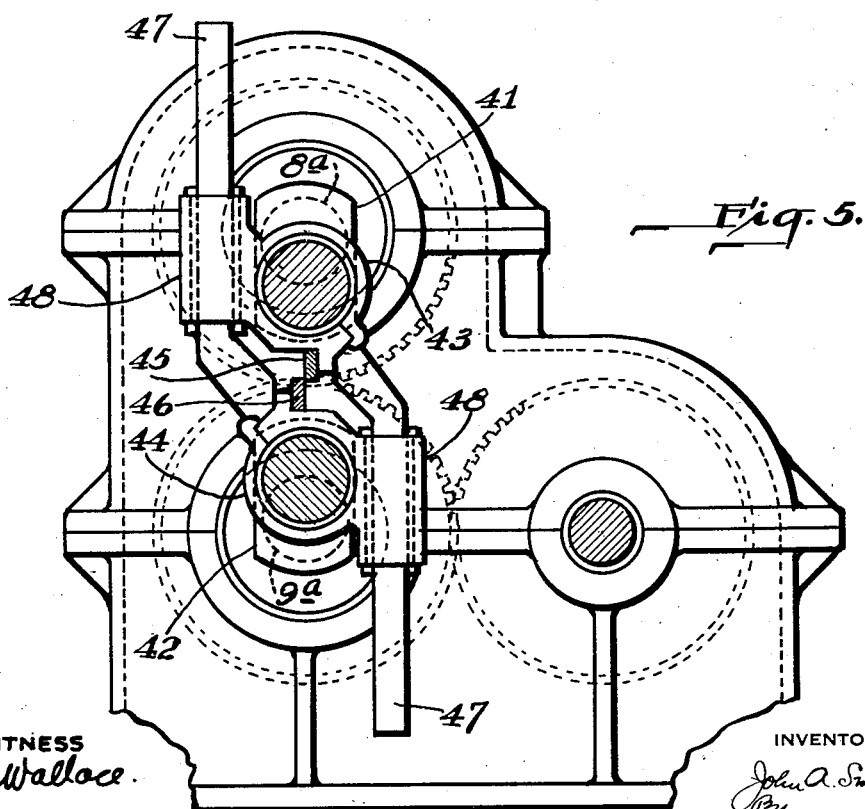

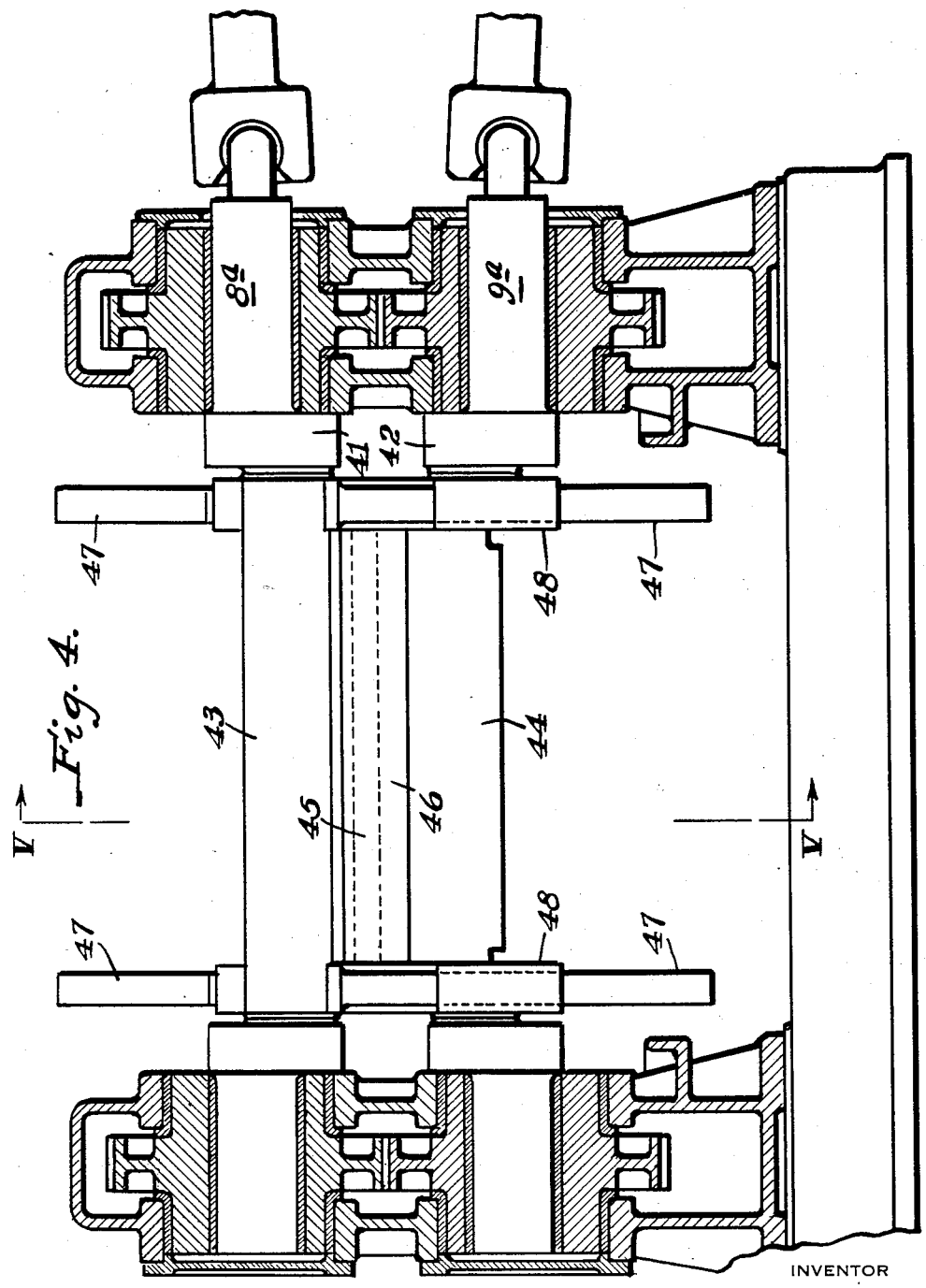

Patented Feb. 20, 1934

1,948,139

UNITED STATES PATENT OFFICE 1,948,139

ROTARY FLYING SHEAR

John A. Smitmans, Pittsburgh, Pa., assignor to United Engineering & Foundry Company, Pittsburgh, Pa., a corporation of Pennsylvania Application August 17, 1931. Serial No. 557,609

9 Claims. (Cl. 164—68)

This invention pertains to metal shearing apparatus, and relates more particularly to a rotary type of what is commonly referred to in the art as a flying shear for cutting sheets, strips, bars and the like into sections of predetermined lengths while the stock is in motion.

The primary object of the invention generally stated is to provide a rotary type shear which is of simple and sturdy construction, dependable in operation, and in which provision is made for adjusting it to miss cuts without otherwise altering the continuous operation of the shear, and whereby rendering it capable of cutting sections of various lengths without altering the speed of the shear or stock.

A more particular object is to provide in a shear of the above-described character for easily and efficiently moving the axes of the cutting blades toward and away from each other while the shear is in operation to thereby cause the blades to miss or make cuts as they are rotated.

These and various other objects, as well as the various other novel features and advantages of the invention will be apparent when the following detailed description is read in conjunction with the accompanying drawings wherein Fig. 1 is a front view partly in section and partly in elevation of one embodiment of the invention; Fig. 2 is a section of the same taken on the line II—II of Fig. 1; Fig. 3 a plan view of the same machine showing the upper half of the upper cutter bearing removed; Fig. 4 is a view similar to Fig. 1 of another embodiment of the invention; and Fig. 5 a sectional view of the latter taken on the line V—V of Fig. 4.

Referring in detail to the drawings, the invention as illustrated in Figs. 1, 2 and 3 comprises a drum type rotary shear in which a frame or housing 1 forms the main support for essentially all of the moving parts of the machine. The cutting elements consists of a plurality of shear blades 2 and 3 and 4 and 5 mounted in diametric opposition upon a pair of drum-like support 6 and 7, respectively. The axes of these drums are formed by a pair of drive shafts 8 and 9 the ends of which are supported in the end walls of the housing 1.

In accordance with the invention annular and rotatably mounted bearings 11 and 12 are provided in the opposite ends of the housing to support the ends of these shafts, and these bearings are provided with openings for the reception of the shaft ends which are eccentric to their outer peripheries. Through the provision of bearings of this form it is possible to vary the relative positions of shafts 8 and 9 by merely rotating either or both pair of the bearings in the opposite ends of frame 1. To properly carry out their purpose such bearings are so dimensioned that when in certain relative positions they support shafts 8 and 9 in such a way as to prevent blades 2 and 4 or 3 and 5 making cutting engagement with each other when rotated to points opposite to each other, and when in other positions to cause the blades to produce cuts when rotated to oppose positions. Preferably the bearings are so mounted that when the thinner walls thereof are adjacent to each other shafts 8 and 9 are supported in such positions that they will cause the blades to produce cuts when the drums are rotated.

To facilitate the adjustment of the bearings they are equipped with either integrally formed or separately attached actuating gears 13 and 14 which are arranged to mesh with each other and to travel in grooves 15 provided in the end walls of frame 1. Through the provision of these gears which are of equal diameter the centers of the shafts 8 and 9 may be displaced conjointly by rotating the gears in one direction or the other. The amount of displacement effected in this manner will vary directly in proportion to the variations in thicknesses of the bearing walls which is determined by the eccentricity of the bearing openings in the bearings themselves. In moving the bearings to cause the blades to miss cuts, it is essential in order to prevent marking of the stock between cuts that the bearings be rotated sufficiently between periods when the blades are rotated into cutting position to cause the blades to completely miss the stock as they are rotated therepast.

For actuating the shear a drive shaft 16 operated in any suitable manner is employed, being connected through a suitable gear-reducing unit 17 with the shafts 8 and 9 on which the blades are mounted. In order to allow for the variable adjustments of shafts 8 and 9, it is necessary to employ power-applying connections between gear unit 17 and these shafts which will not be disturbed by the displacement of the shafts when bearings 13 and 14 are rotated. In the drive shown this is accomplished by providing two stub drive shafts 18 and 19 in gear unit 17 and using wabbler type connecting shafts 21 and 22 for connecting these stub shafts with shafts 8 and 9. To provide for the use of such adjustable elements shafts 8 and 9 are provided with ball and socket-like connecting elements 23 and 24 and shafts 18 and 19 with similar elements 25 and 26. Into these the ends of shafts 21 and 22, are engaged, their ends being suitably shaped in the well known manner for such engagement.

To positively insure proper cutting engagement of the blades when they are adjusted to produce cuts cooperating gears 27 and 28 are mounted on the opposite ends of shafts 8 and 9 and are adapted to engage each other when the shafts are brought into cutting positions by bearings 11 and 12. These gears positively tie the cutter drums together so that the proper cutting engagement of the blades is insured independently of any looseness which may occur in the driving connections due to wear or any other causes.

While any suitable means may be employed for rotating gears 13 and 14 to adjust bearings 11 and 12 and thereby the cutting operation of the blades so long as the bearings are driven or rotated in synchronism with the blades and at speeds properly related thereto, a simple and effective arrangement for such purpose is shown more particularly in Fig. 3. In accordance with this arrangement idler gears 29 are mounted in frame 1 to mesh with gears 14 and with driving gears 31 which in turn are keyed to a shaft 32 also supported in frame 1. This latter shaft is provided on its outer end with a long faced gear 33 adjacent to which there are provided a plurality of gears 34, 35 and 36 having various diameters which are sub-multiples of the diameters of gears 13 and 14. The latter gears are keyed to a shaft 37 driven from gear unit 17, in synchronism with, and at a speed which is such a multiple of the speed of shafts 8 and 9, that when connected to the gears 33 by an idler gear 38, provided for that purpose, they drive the gears 13 and 14 at a speed which is a multiple of the speed of the shafts 8 and 9. This idler gear is keyed on the end of a lever 39 which is pivotally and slidably mounted on a shaft 41, the lever being adapted to permit adjustment of gear 38 to selectively connect any one of gears 34, 35 and 36 with gear 33. With such an arrangement, to alter the lengths of the cuts all that is necessary is to connect gear 38 with one of the gears provided on shaft 37 which will give the number of missing rotations of the blades between cuts to provide the length of cut desired. As will be appreciated, through the use of a multiplicity of different size gears on shaft 37 practically any length of cut within the limits of the machine may be produced in this manner. Such limitations may be determined by the speed at which the bearings must be rotated with respect to the blades to avoid fouling of the stock by the blades between cuts.

In the embodiment of the invention illustrated in Figs. 4 and 5, cranks 41 and 42 are used in place of drums for supporting and rotating the blades. The other parts of this latter embodiment of the invention are the same as those previously described, and, to simplify the description, analogous parts are designated by reference characters similar to those used with the previously described embodiment except that the letter a is attached to each reference to distinguish the two. Upon cranks 41 and 42 blade-supporting heads 43 and 44 carrying blades 45 and 46 are loosely mounted. In this construction in order to guide blades 45 and 46 into cutting engagement when heads 43 and 44 are rotated the heads are indentically equipped at their opposite ends with oppositely disposed guiding elements consisting of guide rods 47 and guiding sleeves 48. The arrangement of these rods and sleeves are such that the rods 47 on one blade support fit into the sleeves 48 on the other. Hence as cranks 41 and 42 are rotated blades 45 and 46 are carried about the axis of shafts 8a and 9a with their cutting faces in a vertical plane. Thus they are in the most advantageous position for cutting when the cut is effected. Furthermore, through such construction the cut is performed when the cutting edges of the blades lie in a plane passing through the centers of both the cranks 41 and 42 and the centers of shafts 8a and 9a. Due to this the least possible strain is imposed upon the cranks and the machine as a whole when the stock is engaged by the blades.

The advantages of the invention will be obvious to those skilled in the art.

It will also be obvious that the invention may be practiced in various other forms than those referred to. Accordingly, such are not intended to constitute any limitation upon the invention as defined in the appended claims.

According to the provisions of the patent statutes, I have explained the principle and operation of my invention, and have illustrated and described what I now consider to represent its best embodiments. However, I desire to have it understood that, within the scope of the appended claims, the invention may be practiced otherwise than as specifically illustrated and described.

I claim:

1. A flying shear comprising a supporting frame, a pair of opposed blade carriers equipped with cutting blades mounted on shafts rotatably supported in said frame, movable bearings arranged in said frame to engage the ends of said shafts, and means operated in synchronism with said carriers for simultaneously moving all of said bearings in a manner to separate both of said shafts or bring them together to cause said blades to miss or make cuts at preselected intervals as the shafts are rotated.

2. A flying shear comprising a supporting frame, a pair of opposed blades mounted for rotation about a pair of parallelly disposed shafts arranged to rotate in said frame, rotatably mounted bearings provided with eccentrically disposed shaft-receiving openings arranged in said frame to engage and support the ends of said shafts, means operated in synchronism with said shafts for rotating said bearing to adjust the relative positions of said shafts so as to cause said blades to miss or make cuts when the shafts are rotated, and means for varying the speed of said bearing rotating means with respect to the speed of said shafts.

3. A flying shear comprising a supporting frame, a pair of cutter shafts arranged for parallel rotation in said frame, cutter blades mounted for rotation on said shafts, annular bearings provided with eccentric shaft receiving openings rotatably mounted in said frame for supporting the ends of said shafts, and gears on said bearings for revolving them to vary the relative positions of said shafts to cause or prevent the cutter blades moving into cutting engagement with each other when said shafts are rotated, and means for rotating said gears at speeds which are multiples of the speeds at which said shafts are rotated.

4. A flying shear comprising a supporting frame, a pair of cutter shafts arranged for parallel rotation in said frame, cutter blades mounted for cooperative rotation on said shafts, annular bearings provided with eccentric shaft-receiving openings rotatably mounted in said frame for adjustably supporting the ends of said shafts, means for revolving said bearings to vary the relative positions of said shafts and thereby cause or prevent the cutter blades moving into cutting engagement when said shafts are rotated, and means provided on said shafts for insuring accurate cutting engagement of said blades when said shafts are rotated in their cutting positions.

5. A flying shear comprising a supporting frame, a pair of cutter shafts arranged for parallel rotation in said frame, cutter blades mounted for cooperative rotation on said shafts, movable bearings adjustably mounted in said frame for supporting the ends of said shafts, means for moving all of said bearings at the same time in a manner to move both of said shafts in opposite directions to vary the relative positions of said shafts and thereby cause or prevent cutting engagement of said blades when said shafts are rotated, driving means for rotating said shafts, and flexible connections between said driving means and said shafts whereby permitting adjustment of the shafts without interfering with said drive.

6. A flying shear comprising a supporting frame, a pair of cutter shafts arranged for parallel rotation in said frame, cutter blades mounted for cooperative rotation on said shafts, annular gears provided with eccentrically disposed shaft-receiving openings rotatably mounted on said frames for supporting the ends of said shafts and gears on said bearings for revolving them to vary the relative positions of said shafts whereby to cause or prevent the blades moving into cutting engagement when rotated, and means driven in synchronism with said shafts for rotating said bearing gears.

7. A flying shear comprising a supporting frame, a pair of cutter shafts arranged for parallel rotation in said frame, cutter blades mounted for cooperative rotation on said shafts, annular gears provided with eccentrically disposed shaft-receiving openings rotatably mounted in said frames for supporting the ends of said shafts and gears on said bearings for revolving them to vary the relative positions of said shafts whereby to cause or prevent the blades moving into cutting engagement when rotated, means driven in synchronism with said shafts for rotating said bearing gears, and means for varying the relative speeds of said gears with respect to that of the shafts to vary the lengths of the cuts produced by the blades.

8. A flying shear comprising a supporting frame, a pair of blade-supporting drums mounted for cooperative rotation on said frame, opposed blades mounted on said drums, a pair of cutter shafts for supporting said drums, annular bearings provided with eccentric shaft-receiving openings rotatably mounted on said frames for adjustably supporting the ends of said shafts, and means for revolving said bearings to cause or prevent the blades making cutting engagement with each other when said drums are rotated.

9. A flying shear comprising a supporting frame, a pair of shafts mounted on said frame said shafts being provided with blade-supporting cranks, a pair of blade heads loosely mounted on said cranks, cooperating blades mounted on said heads, cooperating guiding elements on said heads for controlling the position of said blades on said cranks as said shafts are rotated, annular bearings provided with eccentrically disposed shaft-receiving openings rotatably mounted in said frame for adjustably supporting the ends of said shafts, and means for revolving said bearings to vary the relative positions of said shafts and thereby cause or prevent said blades moving into cutting engagement as said cranks are rotated.

JOHN A. SMITMANS.